Jan. 24, 1956 G. R. SUTHERLAND ET AL 2,731,995
ROTOR CONSTRUCTION FOR ENSILAGE AND FORAGE CUTTER
Filed June 20, 1951 3 Sheets-Sheet 1
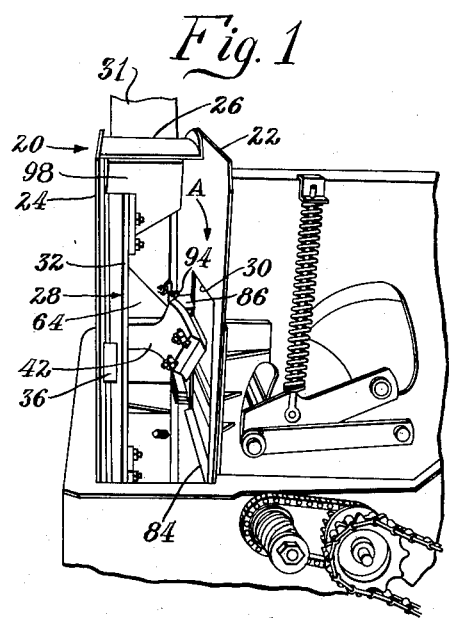
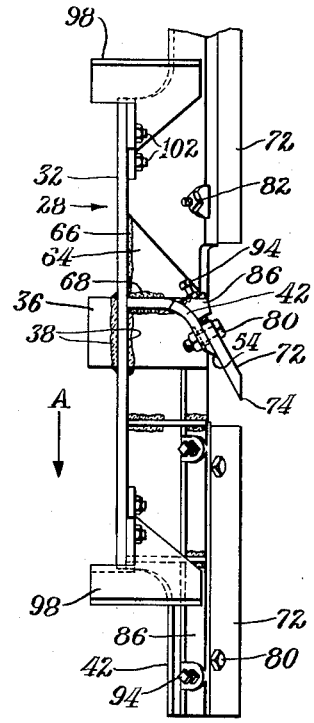
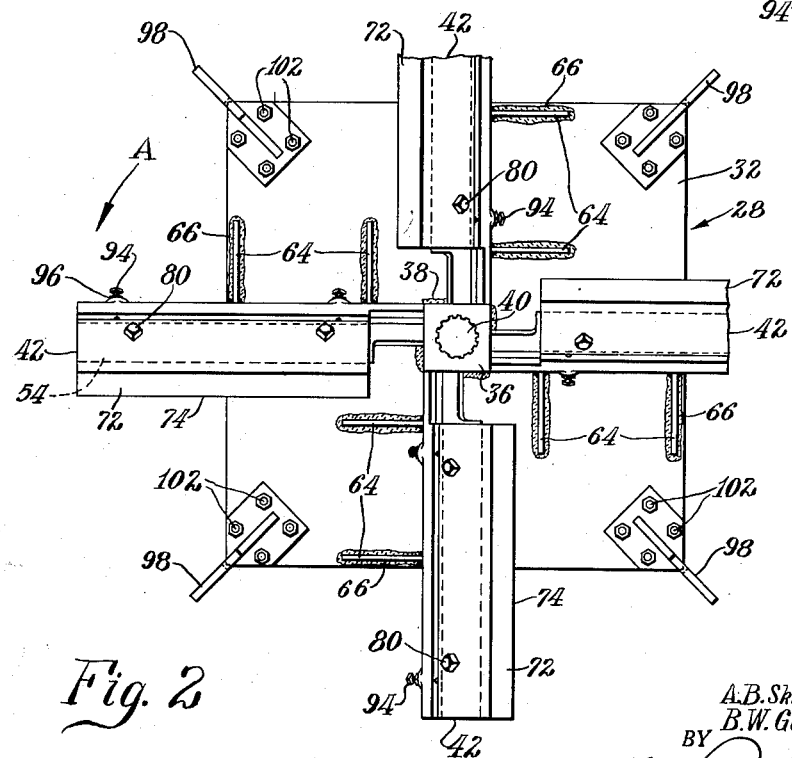
INVENTORS
A.B. Skromme, G.R. Sutherland,
B.W. Gustafson
BY
Attorneys

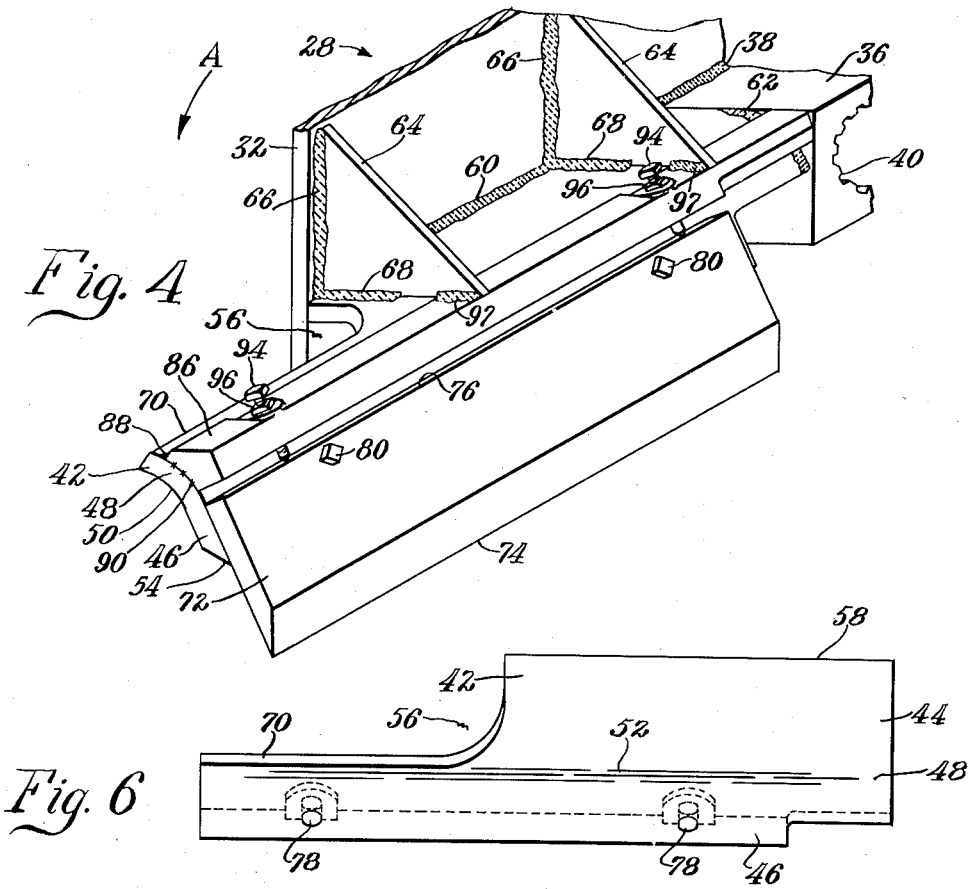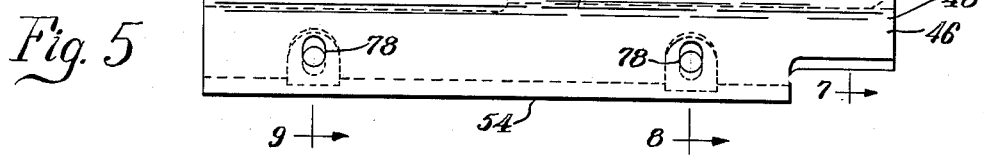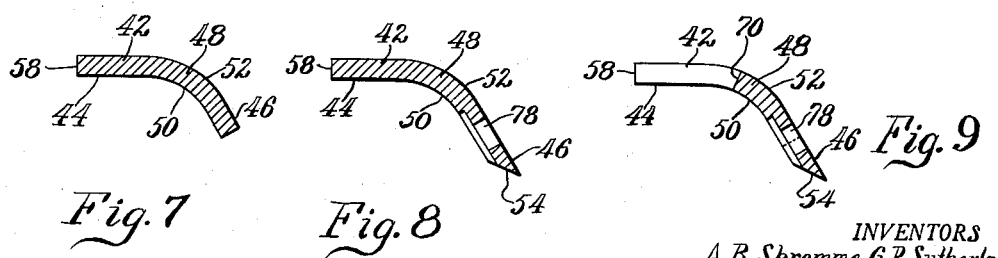

Jan. 24, 1956  G. R. SUTHERLAND ET AL  2,731,995
ROTOR CONSTRUCTION FOR ENSILAGE AND FORAGE CUTTER
Filed June 20, 1951  3 Sheets-Sheet 3

INVENTORS
A. B. Skromme, G. R. Sutherland,
B. W. Gustafson
BY
Attorneys

United States Patent Office 2,731,995
Patented Jan. 24, 1956

2,731,995

ROTOR CONSTRUCTION FOR ENSILAGE AND FORAGE CUTTER

Gail R. Sutherland, Blaine W. Gustafson, and Arnold B. Skromme, Ottumwa, Iowa, assignors to Deere Manufacturing Co., Dubuque, Iowa, a corporation of Iowa Application June 20, 1951, Serial No. 232,558

8 Claims. (Cl. 146—108)

This invention relates to a rotor construction for use in the reducing chamber or housing of a machine for chopping or reducing ensilage or forage crops.

A typical machine of this character comprises a drumlike housing or chamber disposed with its axis horizontal and having an opening in one of its radial walls through which crops are fed by any suitable feeding mechanism. Within the chamber is a rotor having a plurality of generally radially arranged arms on each of which is carried a cutting knife. The bottom of the feed opening is provided with a shear bar with which the knives successively cooperate to cut the material into short lengths as the material is fed over the shear bar and into the path of the knives. The circumferential wall of the chamber is provided with a tangential discharge outlet through which the material is discharged by what may be termed a combination blowing and throwing action.

Among the difficulties encountered in the design of a machine of this type, foremost is that concerned with the compromise between strength of the rotor and operating efficiency thereof. For example, it is obvious that mere increase in the mass of the rotor will afford more than adequate strength. At the same time, it must be considered that increase in mass requires more power to drive the rotor and further requires increase in the size and strength of the bearings and supporting structure for the rotor. The reduction in mass as an end in itself is unsatisfactory, because the rotor then becomes too light and is subjected to deflection in a generally axial direction by forces resulting from the shearing action between the knives and the shear bar. Surprisingly enough, the material fed across the shear bar is sufficient to deflect a lightly supported knife to such extent that cutting is eliminated and the material is drawn into the housing in such quantity as to cause clogging. These problems are further complicated by the requirement that the knife itself should not serve as a paddle and the support for the knife must be such as to elimniate to as great an extent as possible the winding or wrapping of crops thereabout. In the ordinary construction of a rotor, a disk is utilized as the main member and the arms are radially arranged and mounted on the disk. If the disk is relatively large in diameter, it presents a surface against which the incoming crops abut, which means that the length to which the crops may be cut is materially limited. On the other hand, if the disk is too small, there is not adequate support for the knives.

The subject matter of assignee's Patent 2,510,633 constitutes a major step in the direction of providing a suitable rotor construction of the character mentioned. The present invention provides a still further improvement and aims primarily to provide a rotor construction in which each of the knife-suporting arms is cut away adjacent its outer end, thereby allowing incoming material to flow over the arms and within the housing; this permits complete utilization of the housing area, normally occupied in prior art constructions by the knife support. Also provided is a knife and knife support in which the clearance angle relative to incoming material is sufficiently high as to constitute substantially no obstacle to incoming material following that being cut. In this respect, it must be borne in mind that the cutter rotates at a relatively high speed and the fundamentals thereof described in mere statemnets of what happens at a given time may appear somewhat incongruous, but taken as a whole the factors are important.

Other objects of the invention reside in: the shape of the knife support, which is curved in section to facilitate material flow; the provision of a cutter having adequate weight for the required inertia without obstructing the flow of material; the utilization of a knife support in which brackets and projecting supports are eliminated, thus minimizing or altogether obviating the winding or wrapping of material; the use and location of additional supports such as gusset means confined to an area adjacent the center of the rotor, leaving unobstructed, narrow outer portions of the rotor arms; and the location of the knives relative to the general plane of the rotor so as to make possible the chopping of forage material, such as dry hay, in longer lengths.

The foregoing and other important objects and desirable features inherent in and encompassed by the invention will become apparent as a preferred embodiment of the invention is fully disclosed in the following detailed description and accompanying sheets of drawings in which—

Figure 1 is a fragmentary perspective view showing a portion of the rotor and reducing housing of a machine of the character referred to;

Figure 2 is a face view of the improved rotor construction, portions of two of the knives and knife supports being broken off to facilitate placing of the view on the sheet;

Figure 3 is an end view of the rotor construction shown in Figure 2;

Figure 4 is an enlarged fragmentary perspective view showing the mounting of the knife and knife support on the rotor plate;

Figure 5 is a front or face view of the knife support;

Figure 6 is a plan view of the knife support;

Figure 10:
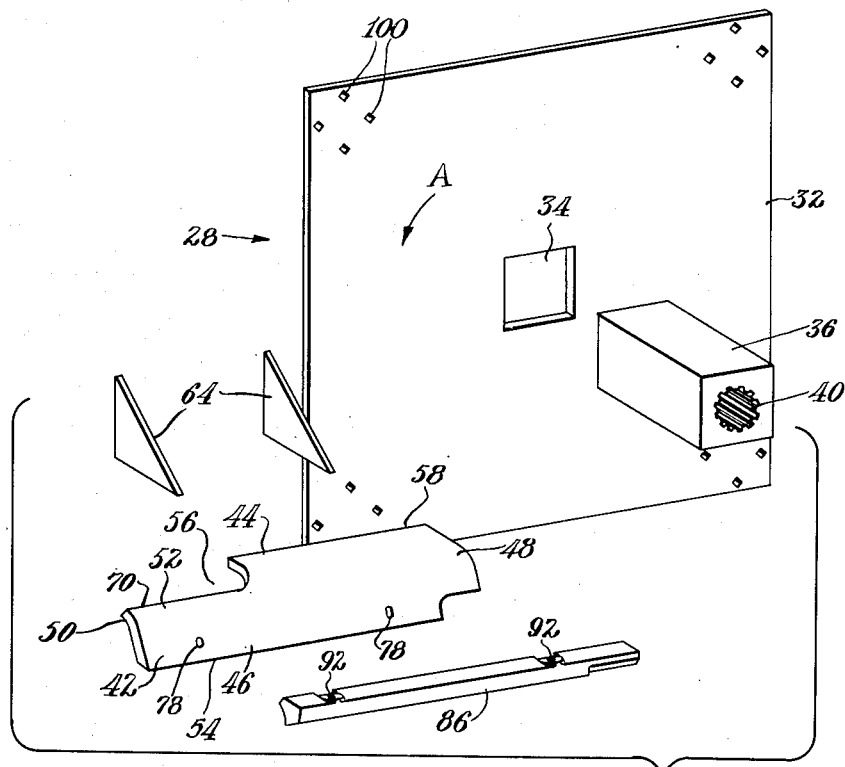
Figure 11:
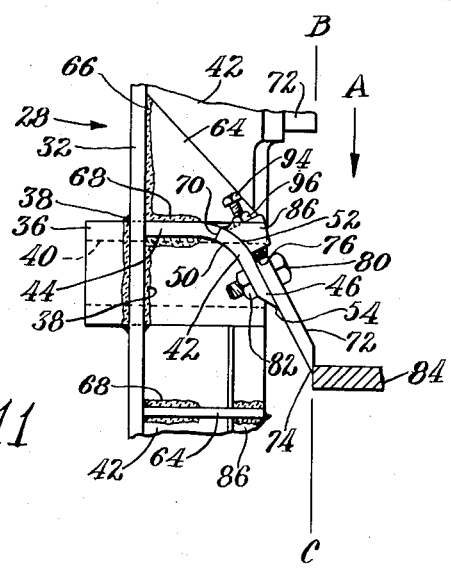
Figure 12:
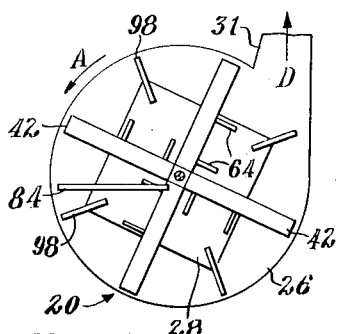

Figures 7, 8 and 9 are respectively transverse sections on the lines 7—7, 8—8 and 9—9 of Figure 5;

Figure 10 is an exploded view on a reduced scale showing the assembly of the parts disclosed in Figure 4;

Figure 11 is an enlarged fragmentary view showing the relationship between a knife and the shear bar over which material is fed; and Figure 12 is a schematic illustration of the rotor and its relation to its housing.

That portion of the machine shown in Figure 1, which is representative only, shows part of a rotor housing 20 having front and rear radial walls 22 and 24 and a circumferential wall 26. A cover portion of the housing has been omitted from the view to expose a rotor 28 within the housing.

The wall 22 has therein a feed opening 30 through which material may be fed into the housing 20 by any suitable means, portions of the driving mechanism for which are illustrated generally. Details of one form of means of this nature may be seen in assignee's patent referred to above. The housing further has a generally tangential discharge spout or outlet 31 (Figure 12).

As best shown in Figures 4 and 10, the rotor 28 comprises a rotor plate 32, which is preferably square and which has a central opening or aperture 34. This aperture is likewise square and its edges or sides are respectively parallel with the edges or sides of the square plate 32. A hub 36 that is square in cross section is received within the aperture 34 and is welded about the aperture to the plate 32 as at 38 (Figure 4). The hub has a splined bore 40 for receiving a shaft (not shown) by means of which the rotor may be mounted for rotation in the housing 20.

The rotor further has a plurality (here four) of knife-supporting arms 42 arranged in what may be termed, for convenience, uniform angularly spaced relation about the center of the rotor; although, the arms need not lie exactly on radii. Each arm comprises a first flange 44 and a second flange 46, and the two flanges are related at an obtuse angle via an integral curved section 48 which presents on the knife support a smooth concave inner or under surface 50 and a rounded or convex outer corner 52. As best shown in Figure 11, the knife support 42 is mounted on the rotor plate 32 in such manner that the flange 44 is normal to the plane of the proximate face of the plate, and the flange 46 is at an acute angle to the plate. Therefore, considering that the rotor rotates in the direction of the arrow A shown in the various views, the flange 46 inclines generally axially outwardly and also in the direction of rotation, presenting a beveled leading edge 54.

The length of the first flange 44 is somewhat shorter than that of the second flange 46, extending only from the hub 36 to the proximate edge or side of the square plate 32, whereas the second flange continues radially outwardly beyond the peripheral edge of the plate 32. Stated otherwise, the first and second flanges provide a relatively wide imperforate portion of the arm between the center and the edge of the plate, and the extension of the second flange 46 beyond the periphery provides a second portion cut out at 56 to reduce the area of the outer end of the arm in a plane transverse to the face of the plate. Thus, the first flange 44 is eliminated between the proximate edge of the square plate 32 and the outer end of the knife-supporting arm 42. The flange 44 has a straight inner or plate-proximate edge 58 which is rigidly secured, as by welding at 60, to the face of the plate 32. The inner end of the arm or support 42 may be further rigidly secured, as by welding at 62, to the proximate face of the hub 36. Further strength and reenforcement for the knife support is obtained by means of additional supports in the form of a pair of gusset plates 64, welded at 66 along their upright edges to the plate 32 and welded at 68 along their lower edges to the top face or trailing surface of the first flange 44 of the knife-supporting arm 42. The design of the flange 44 so that it spans the gussets 64 prevents material from wrapping around the gussets. In other words, the arm 42 may be considered closed at 44 and open at 56, which is consistent with the flow of material under action of combined downward and centrifugal forces as the arm meets material fed into the housing. The outer gusset is located at the inner end of the cut out 56 and definitely over the flange 44; hence, it does not interfere with material flow past 56.

The extension of the second flange 46 of the knife-supporting arm 42 radially beyond the proximate edge or side of the square plate 32 presents an inner edge 70 that is spaced axially outwardly from the plane of the proximate face of the plate. This portion of the flange 46 includes a portion of the curved section 48, which means that the flange 46 along the edge referred to is of angular or curved-section construction and consequently has great strength. The radius on which the curved section 48 is formed is relatively large, giving the section a smooth contour so as to interfere as little as possible with the flow of material within the housing 20. Since the first flange 44 is discontinued at the proximate edge or side of the square plate 32, there is complete utilization of the outer circumferential portion of the housing, normally occupied by supports or mounting brackets in prior constructions.

The outwardly inclined surface of the flange 46 of each knife support 42 is adapted to carry thereon a flat knife 72 which has a leading sharpened edge 74 and a blunt trailing edge 76. The flange 46 serves to mount the knife 72 by securing means including a pair of apertures in the form of slots 78 which receive bolts 80 carried by the knife and having nuts 82. Since the knife is flat, it has the same angle as the flange 46 relative to the plate 32. The sharpened leading edge 74 cooperates with a shear bar 84 (Figures 1 and 11) conventionally disposed across the bottom of the feed opening 30.

The slots 78 in the flange 46 of the knife support 42 provide for adjustment of the knife 72 relative to the knife support. This adjustment is further facilitated by adjusting means comprising a reenforcing rib or member 86 rigidly secured as by welding at its ends and preferably throughout its length as at 88 and 90 to the outer convex corner 52 at the junction between the flanges 44 and 46 of the knife support. The rib 86 could, of course, be an integral part of the support arm 42. Because the rib 86 runs lengthwise of the knife-supporting arm and is coextensive with the second flange 46, it contributes materially to the strength of the knife support and in addition serves as means for accomplishing adjustment of the knife 72. The latter function is achieved by the provision of a pair of tapped bores 92 in the rib 86, which bores respectively receive set screws 94 having lock nuts 96. Further strength is added by welding of outer portions of the gusset plates 64 to the top of the rib 86, as at 97 (Figure 4).

Another feature of the present design is the utilization of the square plate 32 in such manner that the corners thereof serve as means for mounting a plurality of paddles 98. As best shown in Figure 10, each corner of the plate 32 is provided with a plurality of apertures 100 which are adapted to respectively receive a plurality of securing means in the form of bolts 102 (Figure 2) for mounting the paddles 98. This eliminates the necessity as in some prior constructions of mounting the paddles directly on the knife supports and enables the paddles to operate behind the knives.

In Figure 11, the line B—C represents generally the plane in which material will be cut by coaction between the knife 72 and the shear bar 84. It should be noted that the inclination of the outer face or surface of the knife 72 is at a relatively high angle with respect to the plane in which the line B—C lies. Preferably, this angle is on the order of 28°. It should likewise be noted that the leading edge 54 of the knife-supporting arm 42 is spaced axially from the line B—C toward the plate 32 and that the outer edge of the rib 86 is axially inwardly of the leading edge 54. The outer surface of the rib 86 is likewise at a relatively high angle to the line B—C (or a line parallel to the line B—C), this angle being preferably on the order of about 16°. This angle could be increased by reduction in the size or cross section of the rib 86, but at a slight sacrifice in strength. The factor to be considered here is that these portions are sufficiently far back of the line B—C as to constitute practically no obstacle to the inflow of material. This feature will be appreciated by considering the result that would occur if the plane of the knife 72 were exactly vertical; that is, coincident with the line B—C. The knife would then constitute a bar to the entrance of material following that that had already passed beneath the cutting edge 74 of the knife. Consequently, this material would be turned upwardly and most of it would be missed by the following knife. However, in view of the angle of the face of the knife, the material can move smoothly into the housing a maximum distance and be in position to be cut by successive knives.

Another feature of importance is the cut-out at 56 in the knife-supporting arm 42, whereby the second flange 46 extends radially beyond the first flange 44, the latter terminating at the edge of the plate 32 as previously mentioned. This permits the utilization of the outer circumferential portion of the housing and thus facilitates the flow of material. If the flange 44 is not cut out to form 56, the hay that is sheared by the knife 72 will be trapped beneath the confines of the arm 42. The hay that is sheared by the arm 72 must eventually reach the circumferential band 26 and leave the housing at the discharge spout in the direction of the arrow D (Figure 12). If the hay is trapped beneath the arm 42, it cannot reach the band 26 in a smooth layer but will bunch up in a mass at the radially outermost end of the arm 42. It would then be thrown out of the housing 20 through the discharge spout as a slug. Furthermore, the hay that would be trapped under the arm 42 at its inner portion would have to travel quickly toward the band 26 to reach the opening of the discharge spout when the first hay ahead of it in the mass begins to leave the band 26 and enter the discharge spout opening. Usually, some of the hay cannot make this transition quickly enough, and it will be carried over to successive revolutions. When cut-out 56 is provided, the hay is free to come out from under the arm 42 in the time it takes the arm 42 to move between the stationary knife 84 and the discharge spout 31. Thus, the hay will flow through 56 and will be in motion with the air as it reaches the band 26. Therefore, practically all of the hay will lie very close to the band 26 in a thin layer between the paddles 98 and the arms 42, so that the hay will leave the housing 20 in a smooth flow as soon as any part of the hay reaches the discharge spout. This not only requires less power, but it handles the hay more gently with less shattering of leaves and causes less plugging because the hay is given a chance to flow with the air.

Stated otherwise, the cut-out 56 permits the hay to occupy that portion of the band between the arm 42 and a succeeding paddle 98, which portion is an arc of 45°. Without cut-out 56, the hay would be in a mass under the arm 42 representing an arc of probably 7° instead of 45°. Also, the hay trapped under the arm 42 near the hub 40 would have to reach the outer band of the housing in the short time that the arm 42 would consume in passing the opening of the discharge spout, probably 20°. With cut-out 56, the hay can flow from the center of the housing 20 to the band 26 from the time it is cut until it reaches the discharge spout.

These difficulties are obviated in the present construction because of the design factors mentioned herein, which are briefly the cut-out at 56, the angle of the knife and knife support, the curved section at 48, the relatively narrow reenforcing and adjustment rib 86, and other details that eliminate overhanging and projecting brackets on which material is apt to wind or wrap.

Various features of the invention not specifically enumerated herein will undoubtedly occur to those versed in the art, as likewise will numerous modifications and alterations in the preferred embodiment of the invention disclosed, all of which may be achieved without departing from the spirit and scope of the invention as defined in the appended claims.

What is claimed is:

1. A rotor of the class described, comprising: a rotor plate having a center and an outer periphery; means at the center of the plate for carrying the plate for rotation in one direction about an axis normal to one face of the plate; a plurality of elongated arms arranged on said face in uniform angularly spaced relation and extending from the center of the plate to outer ends radially beyond the periphery of the plate; each arm including a first flange projecting in an axial direction from and having an inner edge lying along and secured to said one face, and a second flange joined to and sloping outwardly away from the first flange at an acute angle to said one face and having an outer mounting surface inclined outwardly from said face and in the direction of rotation of the plate to present a leading edge spaced axially outwardly from and parallel to said face, the junction of said flanges with each other including an integral curved section on a relatively large radius to provide on the arm a smooth concave leading surface and a convex trailing surface; the first flange terminating closely adjacent to the periphery of the plate and the second flange being materially longer and extending radially beyond the periphery of the plate; said second flange, in the portion thereof that extends beyond said periphery, including part of said curved section and having an inner edge lying axially midway between the plane of said face and the leading edge of the second flange; an elongated, relatively narrow reenforcing rib rigid on each arm and running lengthwise along said convex trailing surface and coextensive with the second flange, said rib having an outer edge axially inwardly of the leading edge of the second flange; a plurality of flat elongated knives supported respectively on the second flange mounting surfaces respectively lengthwise of and coextensive with the second flanges, each knife having a trailing edge proximate to the reenforcing rib and a leading cutting edge axially outwardly of the leading edge of the second flange; means cooperative between each knife and its arm for securing the knife to the arm for adjustment cross-wise of the length of the second flange; and adjusting means, including a plurality of tapped bores in each reenforcing rib on axes parallel to and outwardly of the respective second flange mounting surface, and adjusting screws threaded respectively in the bores and engaging the trailing edges of the respective knives.

2. A rotor of the class described, comprising: a rotor plate having a center and an outer periphery; means at the center of the plate for carrying the plate for rotation in one direction about an axis normal to one face of the plate; a plurality of elongated arms arranged on said face in uniform angularly spaced relation and extending from the center of the plate to outer ends radially beyond the periphery of the plate; each arm including a first flange projecting in an axial direction from and having an inner edge lying along and secured to said one face, and a second flange joined to and sloping outwardly away from the first flange at an acute angle to said one face and having an outer mounting surface inclined outwardly from said face and in the direction of rotation of the plate to present a leading edge spaced axially outwardly from and parallel to said face, the junction of said flanges with each other providing on the arm a concave leading surface; the major portion of the first flange terminating closely adjacent to the periphery of the plate and the second flange being materially longer and extending radially beyond the periphery of the plate; said second flange, in the portion thereof that extends beyond said periphery, including a minor part of the adjoining portion of the first flange and having an inner edge lying axially midway between the plane of said face and the leading edge of the second flange; an elongated, relatively narrow reenforcing rib rigid on each arm and running lengthwise along the leading surface of the junction of said flanges with each other and coextensive with the second flange, said rib having an outer edge axially inwardly of the leading edge of the second flange; a plurality of flat elongated knives supported respectively on the second flange mounting surfaces respectively lengthwise of and coextensive with the second flanges, each knife having a trailing edge proximate to the reenforcing rib and a leading cutting edge axially outwardly of the leading edge of the second flange; means cooperative between each knife and its arm for securing the knife to the arm for adjustment cross-wise of the length of the second flange; and adjusting means cooperative between each reenforcing rib and its proximate knife for adjusting the respective knives.

3. A rotor of the class described, comprising: a rotor plate having a center and an outer periphery; means at the center of the plate for carrying the plate for rotation in one direction about an axis normal to one face of the plate; a plurality of elongated arms arranged on said face in uniform angularly spaced relation and extending from the center of the plate to outer ends radially beyond the periphery of the plate; each arm including a first flange projecting in an axial direction from and having an inner edge lying along and secured to said one face, and a second flange joined to and sloping outwardly away from the first flange at an acute angle to said one face and having an outer mounting surface inclined outwardly from said face and in the direction of rotation of the plate to present a leading edge spaced axially outwardly from and parallel to said face, the junction of said flanges with each other including an integral curved section on a relatively large radius to provide on the arm a smooth concave leading surface and a convex trailing surface; the first flange terminating closely adjacent to the periphery of the plate and the second flange being materially longer and extending radially beyond the periphery of the plate; said second flange, in the portion thereof that extends beyond said periphery, including part of said curved section and having an inner edge lying axially midway between the plane of said face and the leading edge of the second flange; an elongated, relatively narrow reenforcing rib rigid on each arm and running lengthwise along said convex trailing surface and coextensive with the second flange, said rib having an outer edge axially inwardly of the leading edge of the second flange; and each rib including a plurality of tapped bores on axes parallel to and outwardly of the respective second flange mounting surface.

4. A rotor of the class described, comprising: a rotor plate having a center and an outer periphery; means at the center of the plate for carrying the plate for rotation in one direction about an axis normal to one face of the plate; a plurality of elongated arms arranged on said face in uniform angularly spaced relation and extending from the center of the plate to outer ends radially beyond the periphery of the plate; each arm including a first flange projecting in an axial direction from and having an inner edge lying along and secured to said one face, and a second flange joined to and sloping outwardly away from the first flange at an acute angle to said one face and having an outer mounting surface inclined outwardly from said face and in the direction of rotation of the plate to present a leading edge spaced axially outwardly from and parallel to said face, the junction of said flanges with each other providing on the arm a concave leading surface; the major portion of the first flange terminating closely adjacent to the periphery of the plate and the second flange being materially longer and extending radially beyond the periphery of the plate; said second flange, in the portion thereof that extends beyond said periphery, including a minor part of the adjoining portion of the first flange and having an inner edge lying in a plane axially midway between said face and the leading edge of the second flange; an elongated, relatively narrow reenforcing rib rigid on each arm and running lengthwise along the leading surface of the junction of said flanges with each other and coextensive with the second flange, said rib having an outer edge axially inwardly of the leading edge of the second flange; and each rib including a plurality of tapped bores on axes parallel to and outwardly of the respective second flange mounting surface.

5. A rotor of the class described, comprising: a single, square metal plate having at its center a smaller square opening, the edges of the opening being respectively parallel to the edges of the plate; a hub having a portion of square cross-section fitting the opening and secured to the plate about the opening and projecting axially outwardly from one face of the plate at right angles to said face; four radial, elongated arms arranged on said face of the plate in uniform angularly spaced relation about the hub and projecting to outer ends beyond the edges of the plate; each arm comprising a first flange projecting in an axial direction from said face and an integral second flange joined to and sloping outwardly away from the first flange in a plane acutely angled to said one face of the plate; each first flange being relatively short and terminating closely adjacent to the respective edge of the plate, and each second flange being relatively longer and extending radially beyond said edge; each first flange being rigidly joined to said face and also to the hub and the second flange having a free edge spaced axially outwardly from the plane of said face of the plate; a relatively narrow, elongated reenforcing rib rigid on and running lengthwise along each arm at the junction of each first flange with its second flange and coextensive with that portion of the second flange that extends beyond the edge of the plate; knife-mounting means on each arm, comprising adjacent portions of each rib and its second flange; and gusset means rigidly joined to said face of the plate and extending axially outwardly over and rigidly joined to the respective first flange and also projecting further axially outwardly over and rigidly joined to the proximate rib.

6. A rotor of the class described, comprising: a plate having a hub projecting axially outwardly from one face of the plate at right angles to said face; a plurality of radial, elongated arms arranged on said face of the plate in uniform angularly spaced relation about the hub and projecting to outer ends beyond the edges of the plate; each arm comprising a first flange projecting in an axial direction from said face and an integral second flange joined to and sloping outwardly away from the first flange in a plane acutely angled to said one face of the plate; each first flange being relatively short and terminating closely adjacent to the respective edge of the plate, and each second flange being relatively longer and extending radially beyond said edge; each first flange being rigidly joined to said face and the second flange having a free edge spaced axially outwardly from the plane of said face of the plate; a relatively narrow, elongated reenforcing rib rigid on and running lengthwise along each arm at the junction of each first flange with its second flange and coextensive with that portion of the second flange that extends beyond the edge of the plate; knife-mounting means on each arm, comprising adjacent portions of each rib and its second flange; and gusset means rigidly joined to said face of the plate and extending axially outwardly over and rigidly joined to the respective first flange.

7. A rotor of the class described, comprising a rotor member having a flat face, a center and an outer periphery; means at the center of the member for carrying the member for rotation in one direction about an axis normal to said face; and a plurality of elongated arms arranged on said face in uniform angularly spaced relation and extending from the center of the member to outer ends radially beyond the periphery of the member; characterized in that each arm includes a first flange projecting in an axial direction from and having an inner edge lying along and secured to said one face, and a second flange joined to and sloping outwardly away from the first flange at an acute angle to said one face and having an outer mounting surface inclined outwardly from said face and in the direction of rotation of the member to present a leading edge spaced axially outwardly from and parallel to said face, the junction of said flanges with each other including an integral curved section on a relatively large radius to provide on the arm a smooth concave leading surface and a convex trailing surface; the first flange terminates closely adjacent to the periphery of the plate and the second flange is materially longer and extends radially beyond the periphery of the plate; and said second flange includes, in the portion thereof that extends beyond said periphery, part of said curved section and has an inner edge lying axially midway between the plane of said face and the leading edge of the second flange.

8. A rotor of the class described, comprising: a rotor member having a flat face, a center and an outer periphery; a hub having means at the center of the member to mount the member for rotation in one direction about an axis normal to said face; a plurality of elongated arms arranged radially on said face in uniform angularly spaced relation about the center of the member; each arm having a first flange projecting in an axial direction from said face and an integral second flange joined to and sloping outwardly away from the first flange in a plane acutely angled to said one face of the plate to present a relatively large-radius concave surface in the direction of rotation; each first flange being relatively short and terminating closely adjacent to the periphery of the member, and each second flange being relatively longer and extending radially beyond said periphery; each first flange having an inner edge abutting and lying along said face and the second flange having a free leading edge spaced axially outwardly from the plane of said face; said extension of the second flange beyond the first flange providing the radially outermost portion of the arm with a relatively narrow axial dimension; and gusset means rigidly joined to said face and extending axially outwardly over and rigidly joined to the respective first flange; said gusset means being in trailing relation to the respective first flange and being also confined between the center of the member and the point at which each second flange extends beyond the respective first flange.

References Cited in the file of this patent

UNITED STATES PATENTS

| | | |
|---|---|---|
| 1,575,853 | MacGregor | Mar. 9, 1926 |
| 2,385,451 | Krause et al. | Sept. 25, 1945 |
| 2,457,951 | Tuft | Jan. 4, 1949 |
| 2,510,633 | Hill | June 6, 1950 |